US011040390B2

(12) United States Patent
Xu et al.

(10) Patent No.: US 11,040,390 B2
(45) Date of Patent: Jun. 22, 2021

(54) WHEEL CORRECTION DEVICE

(71) Applicant: CITIC Dicastal CO., LTD., Qinhuangdao (CN)

(72) Inventors: Zuo Xu, Qinhuangdao (CN); Guoyuan Xiong, Qinhuangdao (CN); Bowen Xue, Qinhuangdao (CN); Hao Wu, Qinhuangdao (CN); Changcun Xiao, Qinhuangdao (CN); Jiandong Guo, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 153 days.

(21) Appl. No.: 16/257,204

(22) Filed: Jan. 25, 2019

(65) Prior Publication Data

US 2019/0351474 A1   Nov. 21, 2019

(30) Foreign Application Priority Data

May 21, 2018 (CN) .......................... 201810488699.9

(51) Int. Cl.
  *B21D 3/02* (2006.01)
  *B21D 53/30* (2006.01)
  *B21D 3/10* (2006.01)
  *B23B 5/28* (2006.01)
  *B24B 9/04* (2006.01)

(52) U.S. Cl.
  CPC .............. *B21D 53/30* (2013.01); *B21D 3/02* (2013.01); *B21D 3/10* (2013.01); *B23B 5/28* (2013.01); *B24B 9/04* (2013.01)

(58) Field of Classification Search
  CPC ........ B21D 53/264; B21D 53/30; B21D 3/02; B21D 3/00; B21D 3/10; B21D 3/14; B21D 3/16; B21D 53/26; B23B 5/28; B23Q 7/046; B44B 3/065; B24B 9/04
  USPC ................................................ 72/31.02, 705
  See application file for complete search history.

(56) References Cited

U.S. PATENT DOCUMENTS 7,513,034 B2 *   4/2009   Nakano .................. B21D 53/26
                                                              29/802

FOREIGN PATENT DOCUMENTS

| CN | 102975095 A | * | 3/2013 | |
| CN | 102975095 A |   | 3/2013 | |
| CN | 105363839 A | * | 3/2016 | ............. B21D 22/18 |
| CN | 205237043 U | * | 5/2016 | |
| CN | 205237043 U |   | 5/2016 | |
| CN | 206029512 U | * | 3/2017 | |
| CN | 206029512 U |   | 3/2017 | |
| CN | 107063028 A |   | 8/2017 | |
| CN | 108001059 A |   | 5/2018 | |

* cited by examiner

*Primary Examiner* — Adam J Eiseman
*Assistant Examiner* — Dylan Schommer
(74) *Attorney, Agent, or Firm* — Cooper Legal Group, LLC (57) ABSTRACT

A wheel correction device includes a lower correction system, a support detection system, a synchronous clamping rotation system, upper correction systems, an upper lifting clamping drive system, a lower lifting drive system, etc. The wheel correction device can be used for not only correcting the axial and radial deformation of a wheel but also adjusting the correction way according to the type of radial deformation, and has the characteristics of high automation, powerful function, advanced technology, strong versatility and high safety and stability.

1 Claim, 4 Drawing Sheets

WHEEL CORRECTION DEVICE

CROSS-REFERENCE TO RELATED APPLICATIONS

The present application claims benefit of Chinese Patent Application No. 201810488699.9, filed on May 21, 2018, the contents of which are hereby incorporated by reference in its entirety.

BACKGROUND

In the production process of an aluminum alloy wheel, due to the end face deformation of the blank, the end face of the wheel after machining runs out and is unqualified, which causes the wheel to vibrate during driving so as to affect the safety and comfort of driving. At the same time, due to the deformation in heat treatment, the radial deformation in a convex or concave form is also caused. Therefore, an automatic device is needed to correct the end face deformation and the radial deformation of the wheel.

SUMMARY

The present disclosure relates to a correction device, specifically to a wheel correction device.

The objective of the present disclosure is to provide a wheel correction device, which can be used for not only correcting the axial and radial deformation of a wheel but also adjusting the correction way according to the type of radial deformation.

In order to achieve the above objective, the technical solution of the present disclosure is: a wheel correction device includes a frame, first cylinders, first lower guide pillars, first lower guide sleeves, a lower fixed plate, a first servo motor, a lower lifting plate, a first swivel, a first servo electric cylinder, a second servo electric cylinder, a first lower guide rail, a sliding table, a first belt pulley, a first synchronous belt, a second belt pulley, a second servo motor, a first shaft, a first bearing seat, a pressure roller, a second lower guide rail, a first lower sliding plate, third lower guide rails, second lower sliding plates, second shafts, second bearing seats, support rollers, a first gear, first racks, a third servo motor, a fourth shaft, a lower rotating plate, a fifth servo motor, a fourth lower guide rail, a third servo electric cylinder, a third lower sliding plate, a second lower guide sleeve, a second lower guide pillar, a support block, a second rack, a second gear, fifth lower guide rails, spacers, third racks, a third gear, second swivels, fixed shafts, a fourth gear, a carriage, a sixth lower guide rail, a lifting rack, a dial indicator, a fourth rack, a seventh lower guide rail, a fourth servo electric cylinder, a sixth servo motor, a second cylinder, an upper fixed plate, fifth racks, first upper guide rails, a left sliding plate, left bearing seats, left shafts, V rollers, upper pressure blocks, first upper guide pillars, first upper guide sleeves, second upper guide rails, first upper sliding plates, fifth servo electric cylinders, sixth servo electric cylinders, second upper guide pillars, second upper guide sleeves, a seventh servo motor, a third belt pulley, a second synchronous belt, a fourth belt pulley, a third shaft, a third cylinder, an upper lifting plate, a third bearing seat, a first upper rotating plate, clamping jaws, a sixth gear, sixth racks, a second upper rotating plate, third upper guide rails, second upper sliding plates, an eighth servo motor, a fourth upper guide rail, a third upper sliding plate, a seventh servo electric cylinder, a third upper guide pillar, a third upper guide sleeve, an eighth servo electric cylinder, a fifth gear, right shafts, right bearing seats, a right sliding plate, a ninth servo motor, a fourth shaft, a fourth bearing seat, a tenth servo motor, a fifth belt pulley, a third synchronous belt, a lower support plate, a turntable, a sixth belt pulley, third lower guide pillars, third lower guide sleeves and fourth cylinders.

A lower correction system is configured such that: the four first lower guide sleeves and the two first cylinders are fixed below the left side of the lower fixed plate; the four first lower guide pillars matched with the first lower guide sleeves are fixed below the lower lifting plate; the output ends of the first cylinders are hinged to the lower side of the lower lifting plate; the turntable is mounted above the lower lifting plate via the first swivel; the first servo motor is fixed below the lower lifting plate, and the output end of the first servo motor is hinged to the turntable; the sliding table is mounted on the left side above the turntable via first lower guide rail; the second servo electric cylinder is fixed on the left side above the turntable, and the output end of the second servo electric cylinder is connected to the lower side of the sliding table; the first bearing seat is fixed above the sliding table; the first shaft is mounted inside the first bearing seat via a bearing; the pressure roller is fixed at the upper end of the first shaft, and the second belt pulley is fixed at the lower end of the first shaft; the second servo motor is fixed above the sliding table and placed on the left side of the first bearing seat; the first belt pulley is fixed to the output end of the second servo motor; the first belt pulley is connected with the second belt pulley by the first synchronous belt; the first lower sliding plate is mounted on the right side above the turntable via the second lower guide rail; the first servo electric cylinder is also fixed on the right side above the turntable, and the output end of the first servo electric cylinder is connected to the first lower sliding plate; the two second lower sliding plates are mounted above the first lower sliding plate via the third lower guide rails; the two second bearing seats are respectively fixed above the two second lower sliding plates; the two second shafts are mounted in the two second bearing seats via bearings; a support roller is mounted above each of the two second shafts; the third servo motor is fixed below the first lower sliding plate, and the first gear is fixed to the output end of the third servo motor; the two first racks are respectively meshed and fixed on the two second lower sliding plates, and are simultaneously meshed with the first gear.

A support detection system is configured such that: the lower rotating plate is mounted at the top of the fourth shaft; several spacers are mounted in the center above the lower rotating plate via the fifth lower guide rails and uniformly distributed in the circumferential direction; several third racks are respectively fixed on the spacers; several second swivels are mounted at the tops of the spacers via the fixed shafts; the fourth servo motor is fixed in the center below the lower rotating plate, and the third gear is fixed at the output end of the fourth servo motor; the third gear is meshed with the third racks; the third lower sliding plate is mounted above the lower rotating plate via the fourth lower guide rail; the second lower guide sleeve is fixed above the third lower sliding plate; the second lower guide pillar is matched with the second lower guide sleeve; the support block is fixed at the top of the second lower guide pillar; the third servo electric cylinder is fixed below the third lower sliding plate, and the output end of the third servo electric cylinder is connected to the lower side of the second lower guide pillar; the second rack is fixed to the right side of the third lower sliding plate; the fifth servo motor is fixed to the lower left side of the lower rotating plate, and the second gear is fixed to the output end of the fifth servo motor; the second gear is meshed with the second rack; the carriage is mounted above the right side of the lower rotating plate via the seventh lower guide rail; the lifting rack is mounted on the right side of the carriage via the sixth lower guide rail; the dial indicator is fixed to the lifting rack; the fourth servo electric cylinder is fixed to the lower right side of the carriage, and the output end of the fourth servo electric cylinder is connected to the lifting rack; the sixth servo motor is fixed to the lower right side of the lower rotating plate, and the fourth gear is fixed to the output end of the sixth servo motor; the fourth rack is fixed to the left side of the carriage; and the fourth gear is meshed with the fourth rack.

A synchronous clamping rotation system is configured such that: the fifth gear is fixed above the upper fixed plate; the left sliding plate is mounted above the upper fixed plate via a first upper guide rail; the second cylinder is also fixed above the upper fixed plate, and the output end of the second cylinder is connected to the lower side of the left sliding plate; a fifth rack is fixed below the left sliding plate, and the two left bearing seats are fixed above the left sliding plate; a V roller is mounted above each of the two left shafts; the right sliding plate is mounted above the upper fixed plate via a first upper guide rail; a fifth rack is fixed below the right sliding plate, and the two right bearing seats are fixed above the right sliding plate; the fifth rack below the left sliding plate and the fifth rack below the right sliding plate are simultaneously meshed with the fifth gear; the two right shafts are mounted in the right bearing seats via bearings; a V roller is mounted above each of the two right shafts; the ninth servo motor is fixed below the right sliding plate, and the output end of the ninth servo motor is connected with the lower end of one of the right shafts.

An upper correction system is configured such that: the first upper sliding plate is mounted at the top of the frame via the second upper guide rail; the fifth servo electric cylinder is fixed above the frame, and the output end of the fifth servo electric cylinder is connected with the first upper sliding plate; the first upper guide sleeve is fixed to the lower end of the first upper sliding plate; the first upper guide pillar is matched with the first upper guide sleeve; the upper pressure block is fixed below the first upper guide pillar; the sixth servo electric cylinder is fixed to the upper end of the first upper sliding plate, and the output end of the sixth servo electric cylinder is connected with the first upper guide pillar; and this device includes a left upper correction system and a right upper correction system.

An upper lifting clamping drive system is configured such that: the four second upper guide sleeves and the two third cylinders are fixed to the top of the frame; the four second upper guide pillars matched with the second upper guide sleeves are fixed above the upper lifting plate; the output end of the third cylinder is hinged to the upper side of the upper lifting plate; the third bearing seat is fixed below the upper lifting plate; the third shaft is mounted inside the third bearing seat via a bearing; the fourth belt pulley is fixed to the top of the third shaft; the seventh servo motor is fixed above the upper lifting plate, and the third belt pulley is fixed to the output end of the seventh servo motor; the third belt pulley is connected with the fourth belt pulley by the second synchronous belt; the first upper rotating plate is fixed below the third shaft; the second upper rotating plate is fixed below the first upper rotating plate; several second upper sliding plates are mounted above the second upper rotating plate via the third upper guide rails; several clamping jaws are fixed below the second upper sliding plates; the several clamping jaws are uniformly distributed in the circumferential direction; several sixth racks are respectively fixed to the sides of the second upper sliding plates; the eighth servo motor is fixed above the second upper rotating plate, and the sixth gear is fixed to the output end of the eighth servo motor; the sixth gear is meshed with the sixth racks; the third upper sliding plate is mounted on the right side above the second upper rotating plate via the fourth upper guide rail; the eighth servo electric cylinder is fixed above the second upper rotating plate, and the output end of the eighth servo electric cylinder is connected to the right side of the third upper sliding plate; the third upper guide sleeve is fixed below the third upper sliding plate; the third upper guide pillar is matched with the third upper guide sleeve; the seventh servo electric cylinder is fixed to the top of the third upper sliding plate, and the output end of the seventh servo electric cylinder is connected to the top of the third upper guide pillar.

A lower lifting drive system is configured such that: the fourth bearing seat is fixed above the lower support plate; the fourth shaft is mounted inside the fourth bearing seat via a bearing; the fifth belt pulley is fixed to the lower end of the fourth shaft; the tenth servo motor is fixed to the right side above the lower support plate, and the sixth belt pulley is fixed to the output end of the tenth servo motor; the fifth belt pulley is connected with the sixth belt pulley by the third synchronous belt; the four third lower guide sleeves and the two fourth cylinders are fixed below the lower fixed plate; the four third lower guide pillars are fixed below the lower support plate, and fit with the four third lower guide sleeves; and the output ends of the fourth cylinders are hinged to the lower side of the lower support plate.

The wheel correction device can be used for not only correcting the axial and radial deformation of a wheel but also adjusting the correction way according to the type of radial deformation, and has the characteristics of high automation, powerful function, advanced technology, strong versatility and high safety and stability.

LIST OF REFERENCE SYMBOLS

1—frame, 2—first cylinder, 3—first lower guide pillar, 4—first lower guide sleeve, 5—lower fixed plate, 6—first servo motor, 7—lower lifting plate, 8—first swivel, 9—first servo electric cylinder, 10—second servo electric cylinder, 11—first lower guide rail, 12—sliding table, 13—first belt pulley, 14—first synchronous belt, 15—second belt pulley, 16—second servo motor, 17—first shaft, 18—first bearing seat, 19—pressure roller, 20—second lower guide rail, 21—first lower sliding plate, 22—third lower guide rail, 23—second lower sliding plate, 24—second shaft, 25—second bearing seat, 26—support roller, 27—first gear, 28—first rack, 29—third servo motor, 30—fourth servo motor, 31—lower rotating plate, 32—fifth servo motor, 33—fourth lower guide rail, 34—third servo electric cylinder, 35—third lower sliding plate, 36—second lower guide sleeve, 37—second lower guide pillar, 38—support block, 39—second rack, 40—second gear, 41—fifth lower guide rail, 42—spacer, 43—third rack, 44—third gear, 45—second swivel, 46—fixed shaft, 47—fourth gear, 48—carriage, 49—sixth lower guide rail, 50—lifting rack, 51—dial indicator, 52—fourth rack, 53—seventh lower guide rail, 54—fourth servo electric cylinder, 55—sixth servo motor, 56—second cylinder, 57—upper fixed plate, 58—fifth rack, 59—first upper guide rail, 60—left sliding plate, 61—left bearing seat, 62—left shaft, 63—V roller, 64—upper pressure block, 65—first upper guide pillar, 66—first upper guide sleeve, 67—second upper guide rail, 68—first upper sliding plate, 69—fifth servo electric cylinder, 70—sixth servo electric cylinder, 71—second upper guide pillar, 72—second upper guide sleeve, 73—seventh servo motor, 74—third belt pulley, 75—second synchronous belt, 76—fourth belt pulley, 77—third shaft, 78—third cylinder, 79—upper lifting plate, 80—third bearing seat, 81—first upper rotating plate, 82—clamping jaw, 83—sixth gear, 84—sixth rack, 85—second upper rotating plate, 86—third upper guide rail, 87—second upper sliding plate, 88—eighth servo motor, 89—fourth upper guide rail, 90—third upper sliding plate, 91—seventh servo electric cylinder, 92—third upper guide pillar, 93—third upper guide sleeve, 94—eighth servo electric cylinder, 95—fifth gear, 96—right shaft, 97—right bearing seat, 98—right sliding plate, 99—ninth servo motor, 100—fourth shaft, 101—fourth bearing seat, 102—tenth servo motor, 103—fifth belt pulley, 104—third synchronous belt, 105—lower support plate, 106—turntable, 107—sixth belt pulley, 108—third lower guide pillar, 109—third lower guide sleeve, 110—fourth cylinder.

DETAILED DESCRIPTION

The details and working conditions of the specific device according to the present disclosure will be described below in combination with the drawings.

Figure 1:
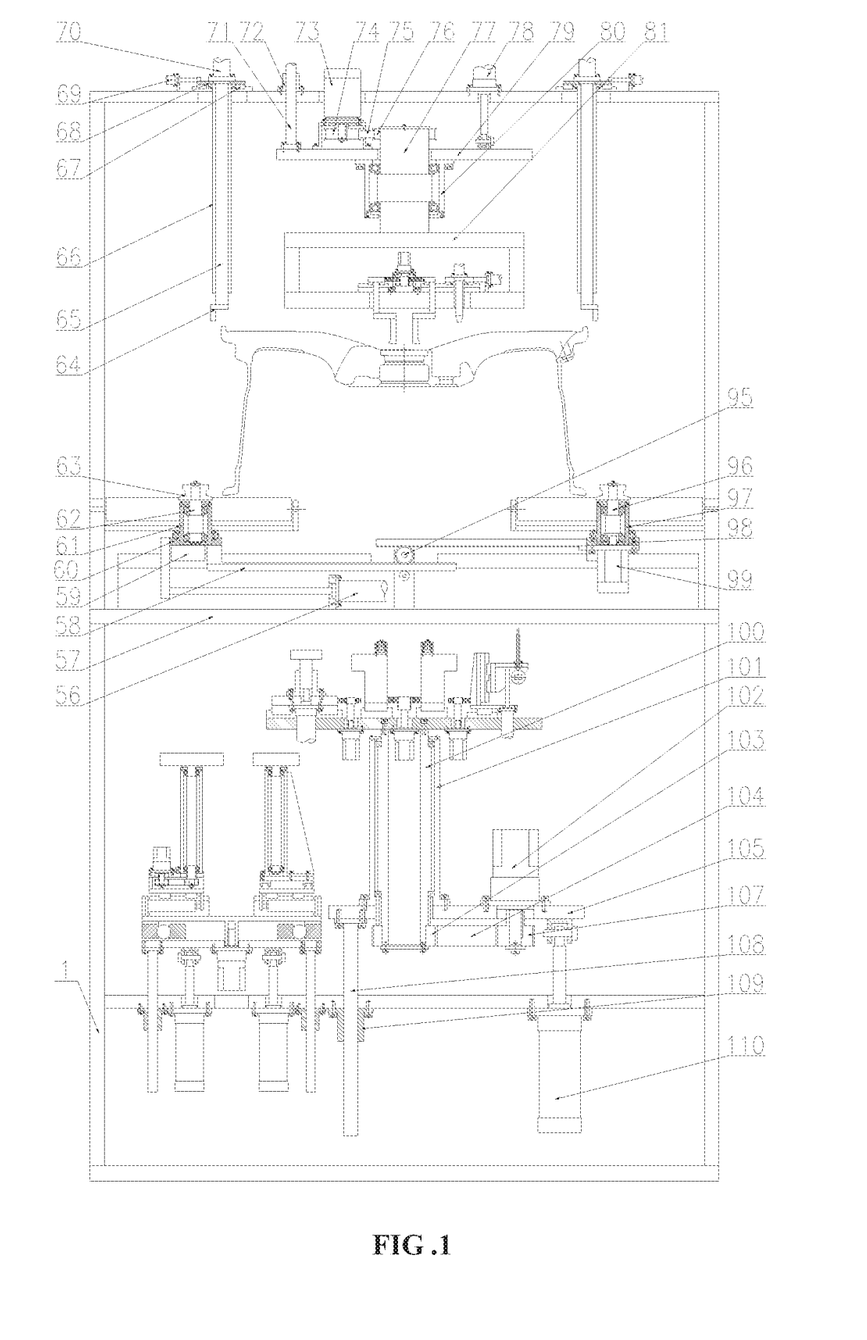
FIG. 1 is a front view of a wheel correction device according to the present disclosure.
Figure 2:
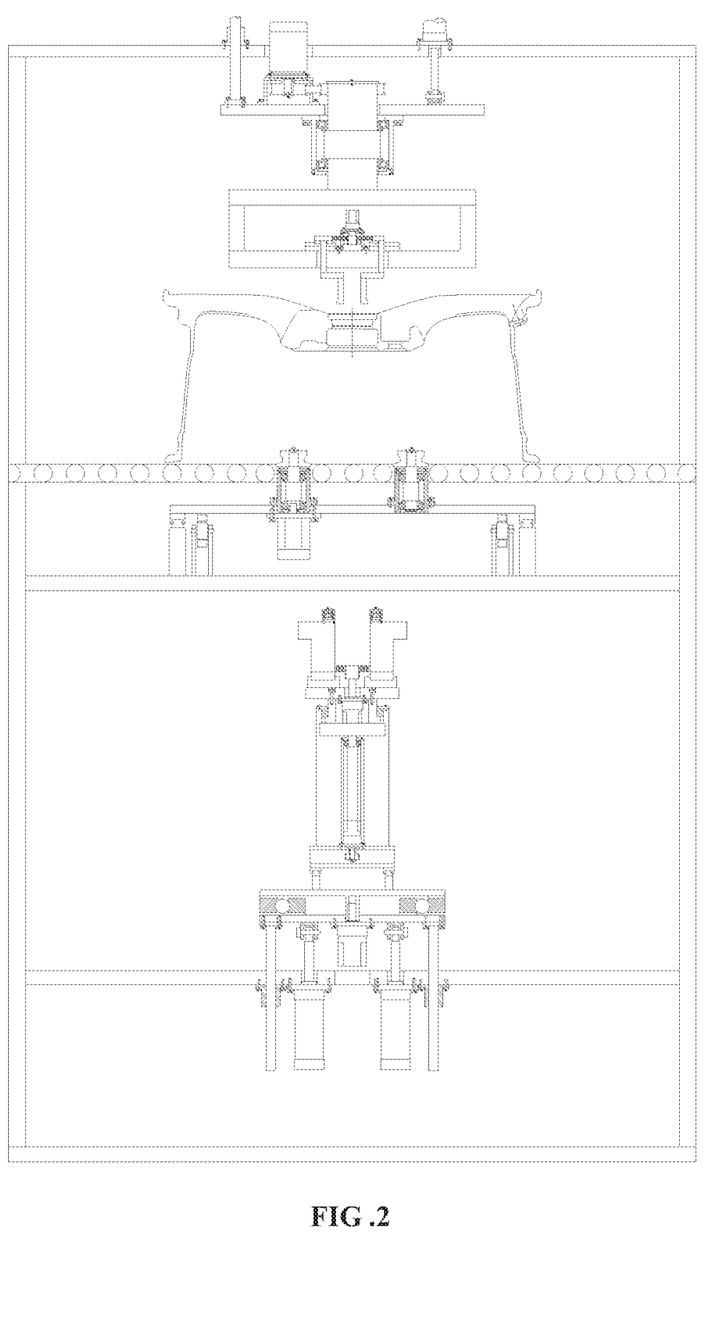
FIG. 2 is a left view of the wheel correction device according to the present disclosure.

The device includes a frame 1, first cylinders 2, first lower guide pillars 3, first lower guide sleeves 4, a lower fixed plate 5, a first servo motor 6, a lower lifting plate 7, a first swivel 8, a first servo electric cylinder 9, a second servo electric cylinder 10, a first lower guide rail 11, a sliding table 12, a first belt pulley 13, a first synchronous belt 14, a second belt pulley 15, a second servo motor 16, a first shaft 17, a first bearing seat 18, a pressure roller 19, a second lower guide rail 20, a first lower sliding plate 21, third lower guide rails 22, second lower sliding plates 23, second shafts 24, second bearing seats 25, support rollers 26, a first gear 27, first racks 28, a third servo motor 29, a fourth servo motor 30, a lower rotating plate 31, a fifth servo motor 32, a fourth lower guide rail 33, a third servo electric cylinder 34, a third lower sliding plate 35, a second lower guide sleeve 36, a second lower guide pillar 37, a support block 38, a second rack 39, a second gear 40, fifth lower guide rails 41, spacers 42, third racks 43, a third gear 44, second swivels 45, fixed shafts 46, a fourth gear 47, a carriage 48, a sixth lower guide rail 49, a lifting rack 50, a dial indicator 51, a fourth rack 52, a seventh lower guide rail 53, a fourth servo electric cylinder 54, a sixth servo motor 55, a second cylinder 56, an upper fixed plate 57, fifth racks 58, first upper guide rails 59, a left sliding plate 60, left bearing seats 61, left shafts 62, V rollers 63, upper pressure blocks 64, first upper guide pillars 65, first upper guide sleeves 66, second upper guide rails 67, first upper sliding plates 68, fifth servo electric cylinders 69, sixth servo electric cylinders 70, second upper guide pillars 71, second upper guide sleeves 72, a seventh servo motor 73, a third belt pulley 74, a second synchronous belt 75, a fourth belt pulley 76, a third shaft 77, a third cylinder 78, an upper lifting plate 79, a third bearing seat 80, a first upper rotating plate 81, clamping jaws 82, a sixth gear 83, sixth racks 84, a second upper rotating plate 85, third upper guide rails 86, second upper sliding plates 87, an eighth servo motor 88, a fourth upper guide rail 89, a third upper sliding plate 90, a seventh servo electric cylinder 91, a third upper guide pillar 92, a third upper guide sleeve 93, an eighth servo electric cylinder 94, a fifth gear 95, right shafts 96, right bearing seats 97, a right sliding plate 98, a ninth servo motor 99, a fourth shaft 100, a fourth bearing seat 101, a tenth servo motor 102, a fifth belt pulley 103, a third synchronous belt 104, a lower support plate 105, a turntable 106, a sixth belt pulley 107, third lower guide pillars 108, third lower guide sleeves 109 and fourth cylinders 110.

Figure 3:
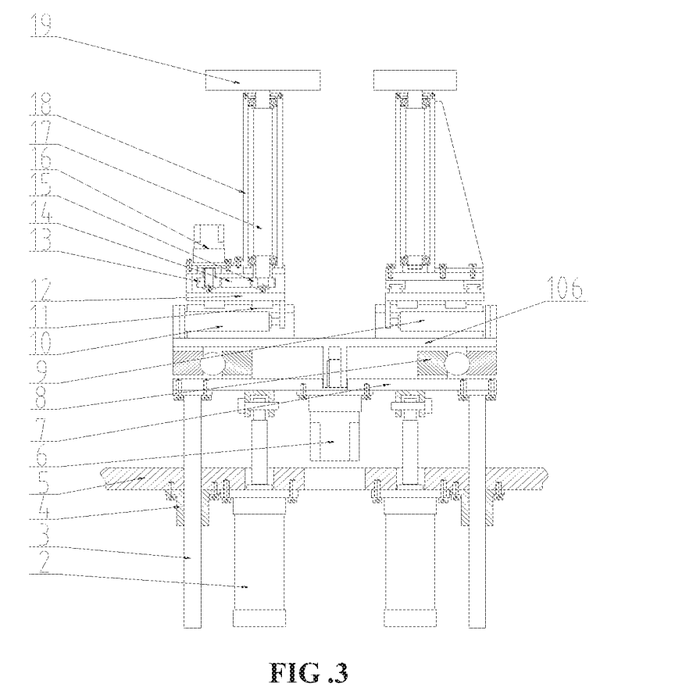
FIG. 3 is a front view of a lower correction system of the wheel correction device according to the present disclosure.
Figure 4:
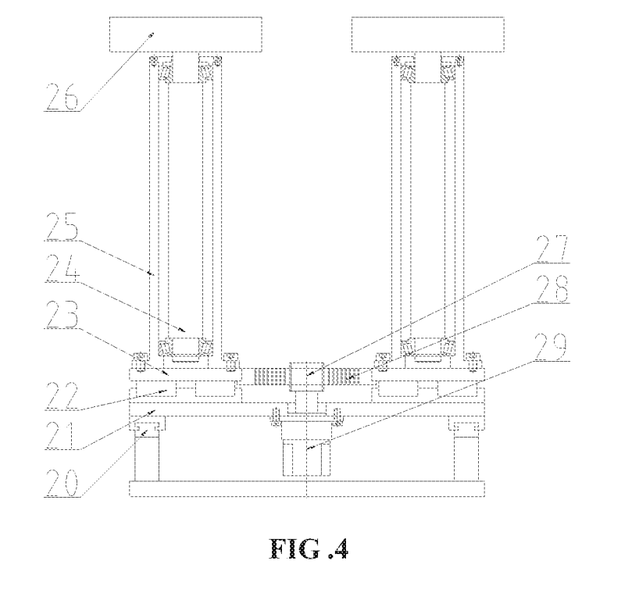
FIG. 4 is a partial right view of the lower correction system of the wheel correction device according to the present disclosure.

A lower correction system is configured such that: the four first lower guide sleeves 4 and the two first cylinders 2 are fixed below the left side of the lower fixed plate 5; the four first lower guide pillars 3 matched with the first lower guide sleeves 4 are fixed below the lower lifting plate 7; the output ends of the first cylinders 2 are hinged to the lower side of the lower lifting plate 7; the turntable 106 is mounted above the lower lifting plate 7 via the first swivel 8; the first servo motor 6 is fixed below the lower lifting plate 7, and the output end of the first servo motor 6 is hinged to the turntable 106; the sliding table 12 is mounted on the left side above the turntable 106 via first lower guide rail 11; the second servo electric cylinder 10 is fixed on the left side above the turntable 106, and the output end of the second servo electric cylinder 10 is connected to the lower side of the sliding table 12; the first bearing seat 18 is fixed above the sliding table 12; the first shaft 17 is mounted inside the first bearing seat 18 via a bearing; the pressure roller 19 is fixed at the upper end of the first shaft 17, and the second belt pulley 15 is fixed at the lower end of the first shaft 17; the second servo motor 16 is fixed above the sliding table 12 and placed on the left side of the first bearing seat 18; the first belt pulley 13 is fixed to the output end of the second servo motor 16; the first belt pulley 13 is connected with the second belt pulley 15 by the first synchronous belt 14; the first lower sliding plate 21 is mounted on the right side above the turntable 106 via the second lower guide rail 20; the first servo electric cylinder 9 is also fixed on the right side above the turntable 106, and the output end of the first servo electric cylinder 9 is connected to the first lower sliding plate 21; the two second lower sliding plates 23 are mounted above the first lower sliding plate 21 via the third lower guide rails 22; the two second bearing seats 25 are respectively fixed above the two second lower sliding plates 23; the two second shafts 24 are mounted in the two second bearing seats 25 via bearings; a support roller 26 is mounted above each of the two second shafts 24; the third servo motor 29 is fixed below the first lower sliding plate 21, and the first gear 27 is fixed to the output end of the third servo motor 29; the two first racks 28 are respectively meshed and fixed on the two second lower sliding plates 23, and are simultaneously meshed with the first gear 27.

Figure 5:
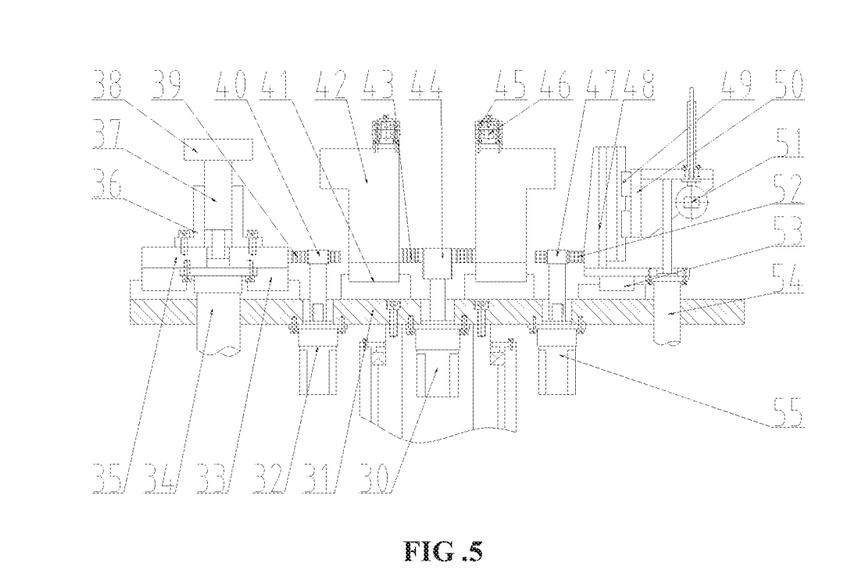
FIG. 5 is a front view of a support detection system of the wheel correction device according to the present disclosure.

A support detection system is configured such that: the lower rotating plate 31 is mounted at the top of the fourth shaft 100; several spacers 42 are mounted in the center above the lower rotating plate 31 via the fifth lower guide rails 41 and uniformly distributed in the circumferential direction; several third racks 43 are respectively fixed on the spacers 42; several second swivels 45 are mounted at the tops of the spacers 42 via the fixed shafts 46; the fourth servo motor 30 is fixed in the center below the lower rotating plate 31, and the third gear 44 is fixed at the output end of the fourth servo motor 30; the third gear 44 is meshed with the third racks 43; the third lower sliding plate 35 is mounted above the lower rotating plate 31 via the fourth lower guide rail 33; the second lower guide sleeve 36 is fixed above the third lower sliding plate 35; the second lower guide pillar 37 is matched with the second lower guide sleeve 36; the support block 38 is fixed at the top of the second lower guide pillar 37; the third servo electric cylinder 34 is fixed below the third lower sliding plate 35, and the output end of the third servo electric cylinder 34 is connected to the lower side of the second lower guide pillar 37; the second rack 39 is fixed to the right side of the third lower sliding plate 35; the fifth servo motor 32 is fixed to the lower left side of the lower rotating plate 31, and the second gear 40 is fixed to the output end of the fifth servo motor 32; the second gear 40 is meshed with the second rack 39; the carriage 48 is mounted above the right side of the lower rotating plate 31 via the seventh lower guide rail 53; the lifting rack 50 is mounted on the right side of the carriage 48 via the sixth lower guide rail 49; the dial indicator 51 is fixed to the lifting rack 50; the fourth servo electric cylinder 54 is fixed to the lower right side of the carriage 48, and the output end of the fourth servo electric cylinder 54 is connected to the lifting rack 50; the sixth servo motor 55 is fixed to the lower right side of the lower rotating plate 31, and the fourth gear 47 is fixed to the output end of the sixth servo motor 55; the fourth rack 52 is fixed to the left side of the carriage 48; and the fourth gear 47 is meshed with the fourth rack 52.

A synchronous clamping rotation system is configured such that: the fifth gear 95 is fixed above the upper fixed plate 57; the left sliding plate 60 is mounted above the upper fixed plate 57 via a first upper guide rail 59; the second cylinder 56 is also fixed above the upper fixed plate 57, and the output end of the second cylinder 56 is connected to the lower side of the left sliding plate 60; a fifth rack 58 is fixed below the left sliding plate 60, and the two left bearing seats 61 are fixed above the left sliding plate 60; a V roller 63 is mounted above each of the two left shafts 62; the right sliding plate 98 is mounted above the upper fixed plate 57 via a first upper guide rail 59; a fifth rack 58 is fixed below the right sliding plate 98, and the two right bearing seats 97 are fixed above the right sliding plate 98; the fifth rack 58 below the left sliding plate 60 and the fifth rack 58 below the right sliding plate 98 are simultaneously meshed with the fifth gear 95; the two right shafts 96 are mounted in the right bearing seats 97 via bearings; a V roller 63 is mounted above each of the two right shafts 96; the ninth servo motor 99 is fixed below the right sliding plate 98, and the output end of the ninth servo motor 99 is connected with the lower end of one of the right shafts 96.

An upper correction system is configured such that: the first upper sliding plate 68 is mounted at the top of the frame 1 via the second upper guide rail 67; the fifth servo electric cylinder 69 is fixed above the frame 1, and the output end of the fifth servo electric cylinder 69 is connected with the first upper sliding plate 68; the first upper guide sleeve 66 is fixed to the lower end of the first upper sliding plate 68; the first upper guide pillar 65 is matched with the first upper guide sleeve 66; the upper pressure block 64 is fixed below the first upper guide pillar 65; the sixth servo electric cylinder 70 is fixed to the upper end of the first upper sliding plate 68, and the output end of the sixth servo electric cylinder 70 is connected with the first upper guide pillar 65; and this device includes a left upper correction system and a right upper correction system.

Figure 6:
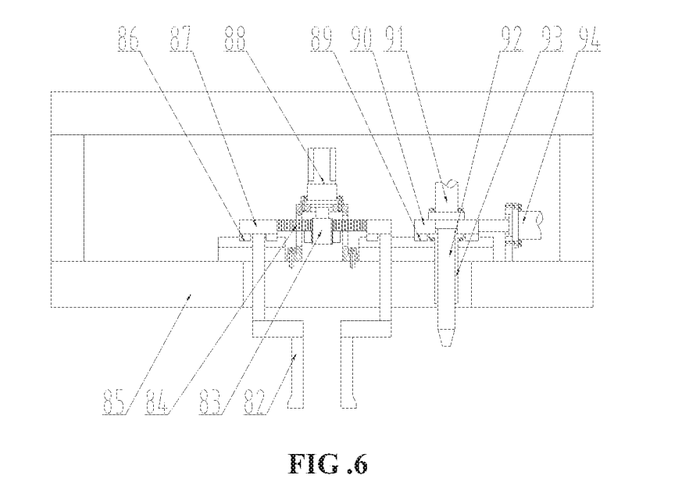
FIG. 6 is a partial front view of an upper lifting clamping drive system of the wheel correction device according to the present disclosure.

An upper lifting clamping drive system is configured such that: the four second upper guide sleeves 72 and the two third cylinders 78 are fixed to the top of the frame 1; the four second upper guide pillars 71 matched with the second upper guide sleeves 72 are fixed above the upper lifting plate 79; the output end of the third cylinder 78 is hinged to the upper side of the upper lifting plate 79; the third bearing seat 80 is fixed below the upper lifting plate 79; the third shaft 77 is mounted inside the third bearing seat 80 via a bearing; the fourth belt pulley 76 is fixed to the top of the third shaft 77; the seventh servo motor 73 is fixed above the upper lifting plate 79, and the third belt pulley 74 is fixed to the output end of the seventh servo motor 73; the third belt pulley 74 is connected with the fourth belt pulley 76 by the second synchronous belt 75; the first upper rotating plate 81 is fixed below the third shaft 77; the second upper rotating plate 85 is fixed below the first upper rotating plate 81; several second upper sliding plates 87 are mounted above the second upper rotating plate 85 via the third upper guide rails 86; several clamping jaws 82 are fixed below the second upper sliding plates 87; the several clamping jaws 82 are uniformly distributed in the circumferential direction; several sixth racks 84 are respectively fixed to the sides of the second upper sliding plates 87; the eighth servo motor 88 is fixed above the second upper rotating plate 85, and the sixth gear 83 is fixed to the output end of the eighth servo motor 88; the sixth gear 83 is meshed with the sixth racks 84; the third upper sliding plate 90 is mounted on the right side above the second upper rotating plate 85 via the fourth upper guide rail 89; the eighth servo electric cylinder 94 is fixed above the second upper rotating plate 85, and the output end of the eighth servo electric cylinder 94 is connected to the right side of the third upper sliding plate 90; the third upper guide sleeve 93 is fixed below the third upper sliding plate 90; the third upper guide pillar 92 is matched with the third upper guide sleeve 93; the seventh servo electric cylinder 91 is fixed to the top of the third upper sliding plate 90, and the output end of the seventh servo electric cylinder 91 is connected to the top of the third upper guide pillar 92.

A lower lifting drive system is configured such that: the fourth bearing seat 101 is fixed above the lower support plate 105; the fourth shaft 100 is mounted inside the fourth bearing seat 101 via a bearing; the fifth belt pulley 103 is fixed to the lower end of the fourth shaft 100; the tenth servo motor 102 is fixed to the right side above the lower support plate 105, and the sixth belt pulley 107 is fixed to the output end of the tenth servo motor 102; the fifth belt pulley 103 is connected with the sixth belt pulley 107 by the third synchronous belt 104; the four third lower guide sleeves 109 and the two fourth cylinders 110 are fixed below the lower fixed plate 5; the four third lower guide pillars 108 are fixed below the lower support plate 105, and fit with the four third lower guide sleeves 109; and the output ends of the fourth cylinders 110 are hinged to the lower side of the lower support plate 105.

During operation, the second cylinder 56 drive the four V rollers 63 via the fifth gear 95, the fifth racks 58 and the first upper guide rails 59 to synchronously clamp a wheel; the fourth servo motor 30 can adjust the positions of the several second swivels 45 via the third racks 43 and the third gear 44; the fourth cylinders 110 can drive the second swivels 45 to rise via the third lower guide pillars 108 to fit with the center hole of the wheel and expand the center hole, and simultaneously drive the upper end surfaces of the spacers 42 to contact a flange surface of the wheel; the sixth servo motor 55 can adjust the horizontal position of the dial indicator 51 via the fourth gear 47, the fourth rack 52 and the seventh lower guide rail 53, and the fourth servo electric cylinder 54 can adjust the longitudinal position of the dial indicator 51 via the sixth lower guide rail 49; the tenth servo motor 102 can drive the dial indicator 51 to rotate circumferentially via the fifth belt pulley 103, the sixth belt pulley 106 and the synchronous belt 104; and the axial deformation at any position in the back cavity can be detected by the above moving dial indicator 51.

The third cylinder 78 drives the clamping jaws 82 to descend via the second upper guide pillars 71 and the second upper guide sleeves 72; the eighth servo motor 88 can drive the clamping jaws 82 via the sixth gear 83, the sixth rack 84 and the third upper guide rails 86 to synchronously move to clamp the cap seam allowance of the wheel; the ninth servo motor 99 can drive the clamped wheel to rotate via the right shaft 96; meanwhile, the eighth servo electric cylinder 94 adjusts the horizontal position of the third upper guide pillar 92 via the fourth upper guide rail 89, and stops when the third upper guide pillar 92 is placed above one of the bolt holes of the wheel, and the seventh servo electric cylinder 91 drives the third upper guide pillar 92 to descend to cooperate with the bolt hole of the wheel; the second cylinder 56 drives the clamped wheel to release via the fifth gear 95 and the fifth racks 58; the third cylinder 78 drives the wheel to ascend via the second upper guide pillars 71; and the seventh servo motor 73 drives the wheel to rotate via the second synchronous belt 75.

The fifth servo motor 32 can adjust the horizontal position of the support block 38 via the second gear 40, the second rack 39 and the fourth lower guide rail 33; the third servo electric cylinder 34 can adjust the longitudinal position of the support block 38 via the second lower guide pillar 37 such that the support block 38 contacts the axial deformation portion of the wheel back cavity, but does not apply vertical force; the fifth servo electric cylinders 69 can adjust the horizontal positions of the upper pressure blocks 64 via the second upper guide rails 67; the right upper pressure block 64 only contacts the end surface of the wheel without applying force; the left sixth servo electric cylinder 70 drives the left upper pressure block 64 via the first upper guide pillar 65 to apply pressure to the axial deformation portion of the wheel, which cooperates with the support block 38 to correct the axial deformation of the wheel.

The radial deformation of the wheel is first detected by an external sensor; the seventh servo motor 73 can drive the radial deformation portion of the wheel to rotate to the leftmost side via the second synchronous belt 75; the first cylinders 2 adjust the longitudinal positions of the pressure roller 19 and the two support rollers 26 to the radial deformation portion of the wheel via the first lower guide pillars 3; according to the arc length at the radial deformation portion, the third servo motor 29 can adjust the spacing of the two support rollers 26 via the first gear 27, the first racks 28 and the third lower guide rails 22; if the radial deformation type of the wheel is outward protrusion, the two support rollers 26 are inside the wheel; if the radial deformation type of the wheel is inward sinking, the two support rollers 26 and the pressure roller 19 exchange the positions via the first servo motor 6 and the first swivel 8; the first servo electric cylinder 9 can drive the support rollers 26 to contact the wheel via the second lower guide rail 20 so as to support the radial deformation portion of the wheel; the second servo electric cylinder 10 can drive the pressure roller 19 via the first lower guide rail 11 to apply horizontal force to the radial deformation portion for correction; meanwhile, the pressure roller 19 reciprocally squeezes around the radial deformation portion of the wheel via the second servo motor 16 and the first synchronous belt 14.

The invention claimed is:

1. A wheel correction device comprising a frame, two first cylinders, four first lower guide pillars, four first lower guide sleeves, a lower fixed plate, a first servo motor, a lower lifting plate, a first swivel, a first servo electric cylinder, a second servo electric cylinder, a first lower guide rail, a sliding table, a first belt pulley, a first synchronous belt, a second belt pulley, a second servo motor, a first shaft, a first bearing seat, a pressure roller, a second lower guide rail, a first lower sliding plate, third lower guide rails, two second lower sliding plates, two second shafts, two second bearing seats, support rollers, a first gear, two first racks, a third servo motor, a fourth servo motor, a lower rotating plate, a fifth servo motor, a fourth lower guide rail, a third servo electric cylinder, a third lower sliding plate, a second lower guide sleeve, a second lower guide pillar, a support block, a second rack, a second gear, fifth lower guide rails, spacers, third racks, a third gear, second swivels, fixed shafts, a fourth gear, a carriage, a sixth lower guide rail, a lifting rack, a dial indicator, a fourth rack, a seventh lower guide rail, a fourth servo electric cylinder, a sixth servo motor, a second cylinder, an upper fixed plate, fifth racks, first upper guide rails, a left sliding plate, two fifth bearing seats, two left shafts, V rollers, upper pressure blocks, first upper guide pillars, first upper guide sleeves, second upper guide rails, first upper sliding plates, fifth servo electric cylinders, sixth servo electric cylinders, four second upper guide pillars, four second upper guide sleeves, a seventh servo motor, a third belt pulley, a second synchronous belt, a fourth belt pulley, a third shaft, two third cylinders, an upper lifting plate, a third bearing seat, a first upper rotating plate, clamping jaws, a sixth gear, sixth racks, a second upper rotating plate, third upper guide rails, second upper sliding plates, an eighth servo motor, a fourth upper guide rail, a third upper sliding plate, a seventh servo electric cylinder, a third upper guide pillar, a third upper guide sleeve, an eighth servo electric cylinder, a fifth gear, two right shafts, two sixth bearing seats, a right sliding plate, a ninth servo motor, a fourth shaft, a fourth bearing seat, a tenth servo motor, a fifth belt pulley, a third synchronous belt, a lower support plate, a turntable, a sixth belt pulley, four third lower guide pillars, four third lower guide sleeves and two fourth cylinders, wherein the wheel correction device comprises a lower correction system, a support detection system, a synchronous clamping rotation system, an upper correction system, an upper lifting clamping drive system, and a lower lifting drive system, the lower correction system is configured such that: the four first lower guide sleeves and the two first cylinders are fixed below a left side of the lower fixed plate; the four first lower guide pillars matched with the four first lower guide sleeves are fixed below the lower lifting plate; output ends of the two first cylinders are hinged to a lower side of the lower lifting plate; the turntable is mounted above the lower lifting plate via the first swivel; the first servo motor is fixed below the lower lifting plate, and an output end of the first servo motor is hinged to the turntable; the sliding table is mounted on a left side of the lower correction system above the turntable via the first lower guide rail; the second servo electric cylinder is fixed on the left side of the lower correction system above the turntable, and an output end of the second servo electric cylinder is connected to a lower side of the sliding table; the first bearing seat is fixed above the sliding table; the first shaft is mounted inside the first bearing seat via a first bearing; the pressure roller is fixed at an upper end of the first shaft, and the second belt pulley is fixed at a lower end of the first shaft; the second servo motor is fixed above the sliding table and placed on a left side of the first bearing seat; the first belt pulley is fixed to an output end of the second servo motor; the first belt pulley is connected with the second belt pulley by the first synchronous belt; the first lower sliding plate is mounted on a right side of the lower correction system above the turntable via the second lower guide rail; the first servo electric cylinder is also fixed on the right side of the lower correction system above the turntable, and the output end of the first servo electric cylinder is connected to the first lower sliding plate; the two second lower sliding plates are mounted above the first lower sliding plate via the third lower guide rails; the two second bearing seats are respectively fixed above the two second lower sliding plates; the two second shafts are mounted in the two second bearing seats via second bearings; a respective one of the support rollers is mounted above each of the two second shafts; the third servo motor is fixed below the first lower sliding plate, and the first gear is fixed to an output end of the third servo motor; the two first racks are respectively meshed and fixed on the two second lower sliding plates, and are simultaneously meshed with the first gear, the support detection system is configured such that: the lower rotating plate is mounted at a top of the fourth shaft; the spacers are mounted above a center of the lower rotating plate via the fifth lower guide rails and uniformly distributed in a circumferential direction; the third racks are respectively fixed on the spacers; the second swivels are mounted at tops of the spacers via the fixed shafts; the fourth servo motor is fixed below the center of the lower rotating plate, and the third gear is fixed at an output end of the fourth servo motor; the third gear is meshed with the third racks; the third lower sliding plate is mounted above the lower rotating plate via the fourth lower guide rail; the second lower guide sleeve is fixed above the third lower sliding plate; the second lower guide pillar is matched with the second lower guide sleeve; the support block is fixed at a top of the second lower guide pillar; the third servo electric cylinder is fixed below the third lower sliding plate, and an output end of the third servo electric cylinder is connected to a lower side of the second lower guide pillar; the second rack is fixed to a right side of the third lower sliding plate; the fifth servo motor is fixed to a lower left side of the lower rotating plate, and the second gear is fixed to an output end of the fifth servo motor; the second gear is meshed with the second rack; the carriage is mounted above a right side of the lower rotating plate via the seventh lower guide rail; the lifting rack is mounted on a right side of the carriage via the sixth lower guide rail; the dial indicator is fixed to the lifting rack; the fourth servo electric cylinder is fixed to a lower right side of the carriage, and an output end of the fourth servo electric cylinder is connected to the lifting rack; the sixth servo motor is fixed to a lower right side of the lower rotating plate, and the fourth gear is fixed to an output end of the sixth servo motor; the fourth rack is fixed to a left side of the carriage; and the fourth gear is meshed with the fourth rack, the synchronous clamping rotation system is configured such that: the fifth gear is fixed above the upper fixed plate; the left sliding plate is mounted above the upper fixed plate via one of the first upper guide rails; the second cylinder is also fixed above the upper fixed plate, and an output end of the second cylinder is connected to a lower side of the left sliding plate; one of the fifth racks is fixed below the left sliding plate, and the two fifth bearing seats are fixed above the left sliding plate; each of two of the V rollers is mounted above a respective one each of the two left shafts; the right sliding plate is mounted above the upper fixed plate via another one of the first upper guide rails; another one of the fifth racks is fixed below the right sliding plate, and the two sixth bearing seats are fixed above the right sliding plate; the fifth rack below the left sliding plate and the fifth rack below the right sliding plate are simultaneously meshed with the fifth gear; the two right shafts are mounted in the two sixth bearing seats via sixth bearings; each of another two of the V rollers is mounted above a respective one of the two right shafts; the ninth servo motor is fixed below the right sliding plate, and an output end of the ninth servo motor is connected with a lower end of one of the two right shafts, the upper correction system is configured such that: each of the first upper sliding plates is mounted at a top of the frame via one of the second upper guide rails; each of the fifth servo electric cylinders is fixed above the frame, and an output end of each of the fifth servo electric cylinders is connected with a respective one of the first upper sliding plates; each of the first upper guide sleeves is fixed to a lower end of a respective one of the first upper sliding plates; each of the first upper guide pillars is matched with a respective one of the first upper guide sleeves; each of the upper pressure blocks is fixed below a respective one of the first upper guide pillars; each of the sixth servo electric cylinders is fixed to an upper end of a respective one of the first upper sliding plates, and an output end of each of the sixth servo electric cylinders is connected with a respective one of the first upper guide pillars; and the wheel correction device comprises two sets of the upper correction system located on a left side of the wheel correction device and a right side of the wheel correction device respectively, the upper lifting clamping drive system is configured such that: the four second upper guide sleeves and the two third cylinders are fixed to the top of the frame; the four second upper guide pillars matched with the four second upper guide sleeves are fixed above the upper lifting plate; an output end of each of the two third cylinders, is hinged to an upper side of the upper lifting plate; the third bearing seat is fixed below the upper lifting plate; the third shaft is mounted inside the third bearing seat via a third bearing; the fourth belt pulley is fixed to a top of the third shaft; the seventh servo motor is fixed above the upper lifting plate, and the third belt pulley is fixed to an output end of the seventh servo motor; the third belt pulley is connected with the fourth belt pulley by the second synchronous belt; the first upper rotating plate is fixed below the third shaft; the second upper rotating plate is fixed below the first upper rotating plate; the second upper sliding plates are mounted above the second upper rotating plate via the third upper guide rails; the clamping jaws are fixed below the second upper sliding plates; the clamping jaws are uniformly distributed in the circumferential direction; the sixth racks are respectively fixed to the sides of the second upper sliding plates; the eighth servo motor is fixed above the second upper rotating plate, and the sixth gear is fixed to an output end of the eighth servo motor; the sixth gear is meshed with the sixth racks; the third upper sliding plate is mounted on a right side of the upper lifting clamping drive system above the second upper rotating plate via the fourth upper guide rail; the eighth servo electric cylinder is fixed above the second upper rotating plate, and an output end of the eighth servo electric cylinder is connected to a right side of the third upper sliding plate; the third upper guide sleeve is fixed below the third upper sliding plate; the third upper guide pillar is matched with the third upper guide sleeve; the seventh servo electric cylinder is fixed to a top of the third upper sliding plate, and an output end of the seventh servo electric cylinder is connected to a top of the third upper guide pillar, the lower lifting drive system is configured such that: the fourth bearing seat is fixed above the lower support plate; the fourth shaft is mounted inside the fourth bearing seat via a fourth bearing; the fifth belt pulley is fixed to a lower end of the fourth shaft; the tenth servo motor is fixed to a right side of the lower lifting drive system above the lower support plate, and the sixth belt pulley is fixed to an output end of the tenth servo motor; the fifth belt pulley is connected with the sixth belt pulley by the third synchronous belt; the four third lower guide sleeves and the two fourth cylinders are fixed below the lower fixed plate; the four third lower guide pillars are fixed below the lower support plate, and fit with the four third lower guide sleeves; and output ends of the two fourth cylinders are hinged to a lower side of the lower support plate, the lower correction system, the support detection system, the synchronous clamping rotation system, the upper correction system, the upper lifting clamping drive system, and the lower lifting drive system cooperate with each other, to allow a correcting of axial and radial deformations of a wheel to be conducted.

\* \* \* \* \*